(12) United States Patent
Mahrs et al.

(10) Patent No.: US 8,931,440 B2
(45) Date of Patent: Jan. 13, 2015

(54) ENGINE COOLING SYSTEM AND METHOD FOR ENGINE COOLING

(75) Inventors: Johan Fredrick Mahrs, Lawrence Park, PA (US); Kyle E. Schmidt, Lawrence Park, PA (US); John Y. Zhang, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 139 days.

(21) Appl. No.: 13/559,007

(22) Filed: Jul. 26, 2012

(65) Prior Publication Data

US 2014/0026831 A1   Jan. 30, 2014

(51) Int. Cl.
  *F01P 7/02* (2006.01)
  *H02H 5/04* (2006.01)
(52) U.S. Cl.
  USPC ........................ 123/41.05; 361/103
(58) Field of Classification Search
  USPC ........................ 123/41.05; 361/103
  See application file for complete search history.

(56) References Cited

U.S. PATENT DOCUMENTS

| | | | | |
|---|---|---|---|---|
| 5,224,446 A * | 7/1993 | Okita et al. | | 123/41.12 |
| 5,529,028 A * | 6/1996 | Weikert | | 123/41.12 |
| 6,700,767 B1 * | 3/2004 | Li | | 361/103 |
| 7,466,053 B1 * | 12/2008 | Radev | | 310/114 |
| 7,971,538 B1 | 7/2011 | Miller et al. | | |
| 2002/0195090 A1 * | 12/2002 | Marsh et al. | | 123/563 |
| 2003/0221676 A1 * | 12/2003 | Glenn et al. | | 123/501 |
| 2004/0216700 A1 * | 11/2004 | Hutchins | | 123/41.08 |
| 2004/0226764 A1 * | 11/2004 | Iwasaki et al. | | 180/68.1 |
| 2006/0086113 A1 * | 4/2006 | Errington et al. | | 62/181 |
| 2008/0115745 A1 * | 5/2008 | Kawaike et al. | | 123/41.02 |
| 2009/0288393 A1 * | 11/2009 | Matsuno et al. | | 60/286 |
| 2009/0320477 A1 * | 12/2009 | Juchymenko | | 60/651 |
| 2010/0100246 A1 * | 4/2010 | Josserand et al. | | 700/282 |
| 2010/0114379 A1 * | 5/2010 | Sato et al. | | 700/275 |

* cited by examiner

*Primary Examiner* — Lindsay Low
*Assistant Examiner* — Charles Brauch
(74) *Attorney, Agent, or Firm* — GE Global Patent Operation; John A. Kramer

(57) ABSTRACT

Various methods and systems are provided for adjusting the speed of a cooling system fan. In one example, a method includes adjusting a speed of a cooling system fan based on ambient temperature, engine output, and a desired engine temperature.

18 Claims, 6 Drawing Sheets

ENGINE COOLING SYSTEM AND METHOD FOR ENGINE COOLING

FIELD

Embodiments of the subject matter disclosed herein relate to an engine cooling system.

BACKGROUND

To reduce overheating on an engine and related components, a cooling system may route coolant through the engine to a radiator or other heat exchanger. The temperature of the engine may be regulated in part by adjusting the speed of one or more cooling system fans. However, temperature over- or under-shoots may occur, particularly during transient events.

BRIEF DESCRIPTION

In one embodiment, a method comprises adjusting a speed of a cooling system fan based on ambient temperature, engine output, and a desired engine temperature. In this way, one embodiment may utilize a feed-forward adjustment that takes into account the engine output changes during a transient event so that the actual coolant temperature better tracks a desired value.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an engine cooling system. The engine cooling system may include multiple variable speed fans configured to cool coolant or air. Each variable speed fan may be regulated by a controller to maintain desired engine temperature. During transient events, fan speed may increase or decrease more than necessary, as the controller tries to rapidly adjust the fan speed in response to the changing operating conditions. According to embodiments disclosed herein, the controller may include one or more regulators that adjust fan speed based on a desired engine temperature, and also based on ambient temperature and engine output. In one example, an expected, steady-state fan speed for the measured ambient temperature and engine output may be fed to the regulator in a feed-forward fashion, and the fan speed may be adjusted based on both the expected fan speed and the desired engine temperature. ("Desired" temperature refers to a target temperature which is sought to be achieved and maintained at least under certain conditions and/or in certain operating modes.)

Figure 1:
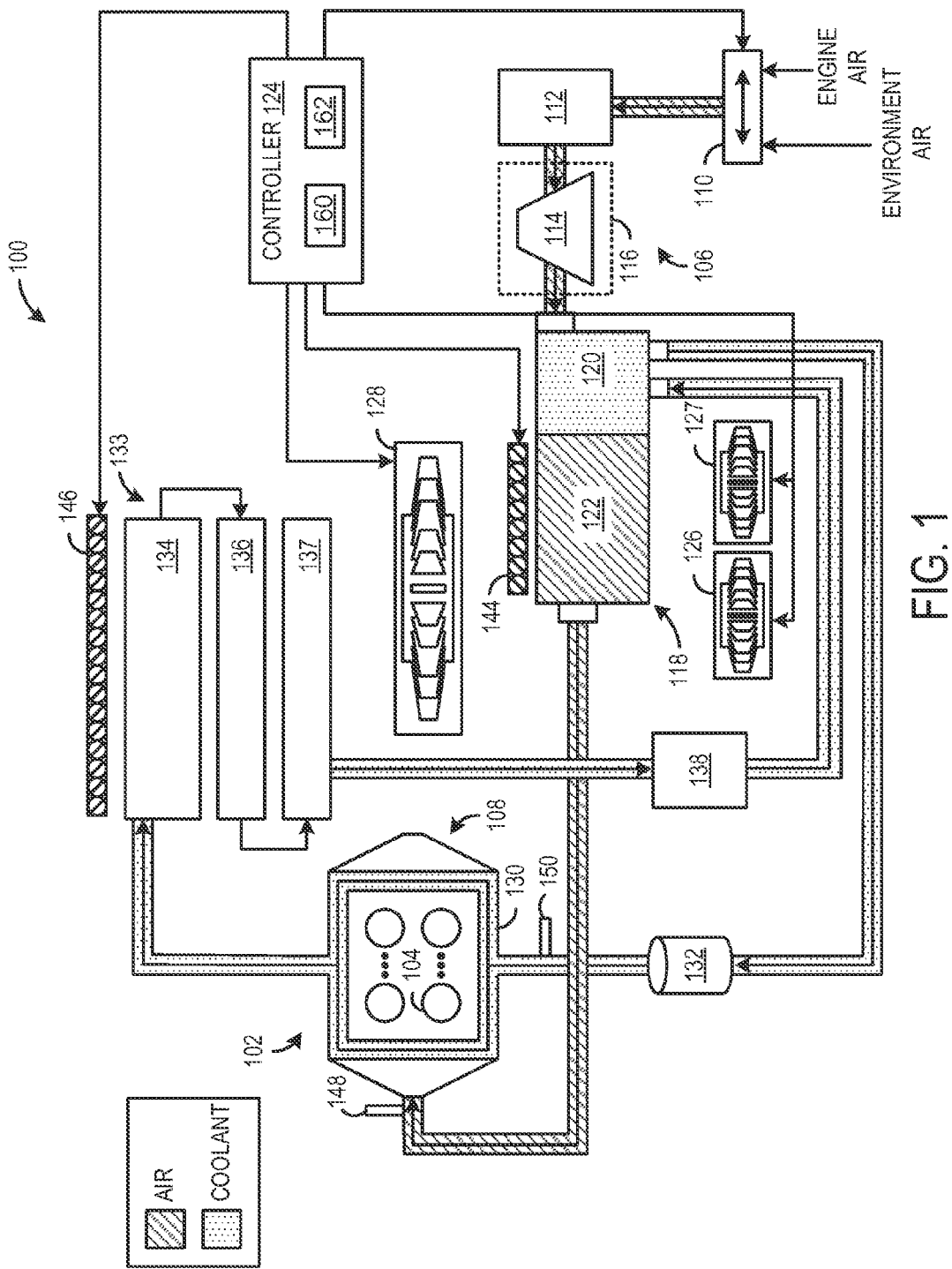
FIG. 1 schematically shows an engine and cooling system according to an embodiment of the present invention.

FIG. 1 shows an embodiment of a thermal management system 100 that is operable to control temperatures of fluids and components of an internal combustion engine 102. The engine 102 includes a plurality of cylinders 104, an air intake structure 106, and an exhaust structure 108. In some implementations, the thermal management system 100 and the engine 102 are coupled to a vehicle. For example, the vehicle may include a locomotive, marine vessel, mining haul truck, other off-highway vehicle (OHV), etc. In some embodiments, the thermal management system 100 and the engine 102 are stationary, such as when incorporated into a power plant or generator. In some implementations, the engine 102 is a diesel engine.

The air intake structure 106 couples to the plurality of cylinders 104 and defines an air intake passage therethrough. Intake air (a.k.a. intake air charge, combustion air, etc.) is delivered to the plurality of cylinders 104 through the air intake passage for combustion. A plurality of thermal management components are positioned in the intake passage to control the temperature and pressure of intake air flowing through the passage. The illustrated implementation includes an air intake door 110, an air filter 112, a compressor 114 of a turbocharger 116, and a multi-stage cooling assembly 118 positioned in the air passage of the air intake structure 106.

The air intake door 110 is coupled to the air intake structure 106. The air intake door 110 is operable to vary combustion intake air temperatures based on operating conditions. In particular, the air intake door 110 is adjustable to at least a first position that connects the air intake passage with an engine compartment to provide intake air from the engine compartment to the air intake passage. Furthermore, the air intake door 110 is adjustable to a second position that connects the air intake passage with environment outside of the engine compartment to provide ambient environment air to the air intake passage. By adjusting the air intake door 110 to the first position to provide intake air from the engine compartment, combustion intake air temperature is increased. By adjusting the air intake door 110 to the second position to provide intake air from the ambient environment, combustion intake air temperature is decreased.

In some implementations, the air intake door 110 is manually adjustable between at least the first position and the second position. In some implementations, the air intake door 110 is automatically adjustable between at least the first position and the second position. In particular, a controller 124 is configured to adjust the air intake door 110 between the first position and the second position based on an operating parameter. For example, the controller 124 may be configured to adjust the air intake door 110 based on intake air temperature. As a particular example, during an engine startup condition, the air intake door 110 is adjusted to the first position to supply warmer intake air from the engine compartment to heat the engine 102. Correspondingly, once the engine has been suitably heated, the air intake door 110 is adjusted to the second position to provide cooler ambient intake air for combustion. As another example, the controller may be configured to adjust the air intake door 110 based on ambient environment temperature. As a particular example, during winter conditions where ambient environment temperature is low, the air intake door 110 is adjusted to the first position to increase engine combustion air intake temperature. The increased intake air temperature reduces the combustion intake air charge density and reduces the combustion pressure on the engine cylinders, which may be more prone to degradation in low temperature. Furthermore, the increased intake air temperature aids in melting any ice or snow that is present in the intake air passage.

The air filter 112 is positioned in the air intake passage defined by the air intake structure 106 downstream from the air intake door 110. The air filter 112 prevents abrasive particulate matter from entering the plurality of cylinders 104 and maintains clean combustion air for the engine 102.

The turbocharger 116 includes the compressor 114 which is positioned in the air intake passage defined by the air intake structure 106, and a turbine (not shown) which is positioned in an exhaust passage that is coupled to the engine 102. The turbine is coupled to the compressor 114 so that the compressor is driven by exhaust gas that spins the turbine. The compressor 114 increases the pressure of combustion air that flows from the air filter 112. The pressure increase of combustion air by the compressor 114 increases charge density of combustion air entering the plurality of cylinders 104. Moreover, increasing the pressure of the combustion air also increases a temperature of the combustion air.

A multi-stage cooling assembly 118 is positioned downstream from the compressor 114 in the air intake passage defined by the air intake structure 106. The multi-stage cooling assembly 118 rejects heat from the combustion air through transfer to different fluids. In particular, the multi-stage cooling assembly 118 includes an air-to-coolant intercooler 120 and an air-to-air intercooler 122 that in combination provide heat rejection to the combustion air. In the illustrated implementation, the air-to-coolant intercooler 120 is positioned adjacent an inlet of the multi-stage cooling assembly 118. Combustion air entering the multi-stage cooling assembly 118 initially flows across a surface of the air-to-coolant intercooler 120 causing heat to be transferred from the combustion air to engine coolant flowing through the air-to-coolant intercooler 120. The combustion air continues through the multi-stage cooling assembly 118 to the air-to-air intercooler 122.

The air-to-air intercooler 122 includes interior fins that, depending on implementation, differ in fin type, fin density, or both fin type and fin density as a function of the location of the interior fins relative to the interior of the air-to-air intercooler 122. The differing interior fin type and/or density aid in forming a combustion air path through the air-to-air intercooler 122 that distributes or balances the combustion air through the interior by a determined amount. Heat is directly rejected from combustion air through the interior fins to the atmosphere. Furthermore, the air-to-air intercooler 122 includes exterior fins that, depending on implementation, differ in fin type, fin density, or both fin type and fin density as a function of the location of the exterior fins relative to the exterior of the air-to-air intercooler 122. The differing exterior fin type and/or density aid in distributing air flow across the air-to-air intercooler 122 so that air flows across a greater portion of the surface area of the air-to-air intercooler 122 to increase heat rejection capabilities.

A first fan 126 and second fan 127 are operable to provide air flow to the multi-stage cooling assembly 118. In particular, air flow from the first and second fans 126, 127 is directed through the exterior fins of the air-to-air intercooler 122 to draw heat from the fins to the atmosphere. In some implementations, operation of the first fan 126 and second fan 127 is adjustable by the controller 124 based on different operating conditions. For example, in one implementation, the controller 124 is operable to adjust a speed of the first fan 126 and/or second fan 127 to adjust air flow provided by the fans. As another example, the controller 124 is operable to adjust a fan blade pitch of the first fan 126 and/or second fan 127 to adjust air flow provided by the fans. In some implementations, the first fan 126 and second fan 127 may be controlled equally such that both fans operate at the same speed and fan blade pitch under all operating conditions. For example, the second fan 127 may be controlled to a speed and fan blade pitch that is in correspondence to the adjustments made to the first fan 126. In other implementations, first fan 126 and second fan 127 may be controlled independently of each other.

In an embodiment, a first cooling shutter 144 is positioned opposite the multi-stage cooling assembly 118 from the first and second fans 126, 127. The first cooling shutter 144 is adjustable to adjust air flow provided to the multi-stage cooling assembly 118. For example, the first cooling shutter 144 can be closed to prevent air flow provided by the first fan 126 from reaching the multi-stage cooling assembly 118. Furthermore, the first cooling shutter 144 provides natural convention heat exchanger loss reduction when closed. On the other hand, the first cooling shutter 144 can be opened to allow air flow provided by the first fan 126 to reach the multi-stage cooling assembly 118. In some implementations, a degree of opening of the first cooling shutter 144 can be variably adjusted to different positions between fully opened and closed to throttle air flow to allow a desired amount of air to reach the multi-stage cooling assembly 118. Such cooling shutter control may be implemented with fans that are not adjustable to provide increased air flow control capability. In some implementations, the controller 124 adjusts the first cooling shutter 144 to control air flow provided to the multi-stage cooling assembly 118 based on operating conditions. For example, the controller is operable to close the first cooling shutter when an engine temperature is below a first designated threshold or when ambient temperature and/or engine gross horsepower are below a threshold. By closing the cooling shutter during such conditions, overcooling of combustion air is reduced, thus allowing the combustion air to heat to a suitable operating temperature more quickly. While the first cooling shutter 144 is illustrated in FIG. 1 as being positioned on an opposite side of the multi-stage cooling assembly 118 from the first and second fans 126, 127, in some embodiments, the first cooling shutter 144 may be positioned between the fans and the multi-stage cooling assembly 118.

The multi-stage cooling assembly 118 provides hybrid cooling of combustion air through control of two different fluids. In particular, flow of both engine coolant and air can be manipulated to control the temperature of combustion air. The multi-stage cooling assembly 118 integrates the air-to-coolant intercooler 120 with the air-to-air intercooler 122 to reduce the overall pipe structure and intercooler length to provide a smaller footprint.

In the illustrated implementation, the multi-stage cooling assembly 118, the first and second fans 126 and 127, and the first cooling shutter 144 form a combustion air cooling group for cooling combustion air. Pressurized combustion air exiting the multi-stage cooling assembly 118 flows through an engine manifold of the engine 102 and is delivered to the plurality of cylinders 104 for combustion.

Continuing with FIG. 1, thermal management of the engine 102 is further controlled by an engine coolant circuit. For example, engine coolant circulates through a water jacket 130, which is fluidly coupled with an air-to-coolant radiator 133. The air-to-coolant radiator may include an air-to-coolant radiator unit 134, which is fluidly coupled with a first air-to-coolant sub-cooler 136, which is fluidly coupled with a second air-to-coolant sub-cooler 137. A coolant-to-oil cooler 138 may be fluidly coupled with the second sub-cooler 137 and fluidly coupled with the air-to-coolant intercooler 120 to form the engine coolant cooling circuit. Engine coolant is pumped through the engine coolant circuit by a coolant pump 132. In some implementations, the coolant pump 132 is a single rotor engine-driven coolant pump.

The water jacket 130 is formed in an engine block surrounding the plurality of cylinders 104. Heat is rejected from the plurality of cylinders 104 through cylinder walls to engine coolant flowing through the water jacket 130. The heated engine coolant flows from the water jacket 130 to the air-to-coolant radiator 133. The engine coolant circulates through various tubes of the radiator unit 134. Heat from the engine coolant is transferred to fins that are positioned between the tubes. The fins radiate the heat transferred from the tubes to the atmosphere. Engine coolant flows from the radiator unit 134 to the first sub-cooler 136 to further cool the engine coolant, and then flows to the second sub-cooler 137. The first and second sub-coolers 136 and 137 create sub-cooled engine coolant by using slower engine coolant flow for more exposure to the radiator fins. While not depicted in FIG. 1, engine coolant may also flow from the radiator unit 134 to the coolant pump 132 through a passive piping flow split tee positioned between the radiator unit 134 and the first sub-cooler 136.

In embodiments, a third fan 128 is operable to provide air flow to the air-to-coolant radiator 133. In some implementations, operation of the third fan 128 is adjustable by the controller 124 based on different operating conditions. For example, in one implementation, the controller 124 is operable to adjust a speed of the third fan 128 to adjust air flow provided by the third fan. As another example, the controller 124 is operable to adjust a fan blade pitch of the third fan 128 to adjust air flow provided by the third fan.

A second cooling shutter 146 is positioned on the opposite side of the air-to-coolant radiator 133 from the third fan 128. The second cooling shutter 146 is adjustable to adjust air flow provided to the radiator. For example, the second cooling shutter 146 can be closed to prevent air flow provided by the third fan 128 from reaching the air-to-coolant radiator 133. Furthermore, the second cooling shutter 146 provides natural convention heat exchanger loss reduction when closed. On the other hand, the second cooling shutter 146 can be opened to allow air flow provided by the third fan 128 to reach the radiator 133. In some implementations, a degree of opening of the second cooling shutter 146 can be variably adjusted to different positions between fully opened and closed to throttle air flow to allow a desired amount of air to reach the air-to-coolant radiator. Such cooling shutter control may be implemented with fans that are not adjustable to provide increased air flow control capability. In some implementations, the controller 124 adjusts the second cooling shutter 146 to control air flow provided to the air-to-coolant radiator. For example, the controller is operable to close the second cooling shutter when an engine coolant temperature is below a second designated threshold. By closing the cooling shutter during such conditions, overcooling of engine coolant is reduced, thus allowing the engine coolant to heat to a suitable operating temperature more quickly.

The coolant-to-oil cooler 138 is operable to receive engine coolant from the second air-to-coolant sub-cooler 136 in the engine coolant cooling circuit (or, in embodiments where the system has the second sub-cooler 137, from the second sub-cooler 137). The coolant-to-oil cooler 138 receives engine oil that is pumped from an oil pan by an oil pump. Oil circulates through the coolant-to-oil cooler 138 and flows to the engine 102 before returning to the oil pan to form an oil cooling circuit. The coolant-to-oil cooler 138 transfers heat to and from the engine coolant from and to the engine oil. The coolant-to-oil cooler 138 acts as a moderator in the oil and engine coolant circuits to drive the oil temperature toward the engine coolant temperature so that the plurality of cylinders 104 and corresponding pistons inside the engine 102 do not expand into the water jacket 130. Such moderation between engine coolant temperature and oil temperature may be particularly applicable in engine configurations in which pistons are cooled by oil jets or other application of oil for piston cooling.

Engine coolant flows from the coolant-to-oil cooler 138 to the air-to-coolant intercooler 120 to reject heat from combustion air flowing through the multi-stage cooling assembly 118 before returning to the coolant pump 132 to complete the engine coolant cooling circuit.

In the illustrated implementation, the controller 124 is a computing device, such as microcomputer that includes a processor unit, input/output ports, memory, and a data bus. The controller 124 is configured to receive various signals from sensors coupled to the engine 102; the controller may be configured to use one or more of the signals as a basis for thermal control of the engine 102. For example, the controller 124 may receive a manifold air temperature (MAT) signal from an air temperature sensor 148 and an engine coolant inlet temperature from a coolant temperature sensor 150 (that is, the engine coolant inlet temperature may be a temperature of engine coolant measured at the inlet region of the engine water jacket, or otherwise in a region where coolant enters an engine to cool the engine). The controller 124, in addition to those signals previously discussed, may also receive signals from other engine sensors such as engine manifold pressure, boost pressure, engine position, engine speed, engine load, air-fuel ratio, exhaust temperature, ambient temperature, etc. Ambient temperature includes the temperature of the air as it enters the intake and may be substantially equal to the temperature of the air outside of the vehicle or other structure in which the engine is incorporated.

The controller 124 is operable to adjust various actuators in the engine 102 based on different operating parameters received or derived from different sensor signals to control temperatures of the engine 102. For example, the controller 124 provides feedback control of the first fan 126, the second fan 127, the third fan 128, the first cooling shutter 144, the second cooling shutter 146, and/or the air intake door 110 to adjust temperatures of the engine 102.

In some implementations, the controller 124 is operable to adjust air flow provided by the first fan 126 and/or second fan 127 based on a first operating parameter, such as manifold air temperature/MAT. In some implementations, the controller 124 is operable to adjust airflow provided by the third fan 128 based on the first operating parameter, and/or on a different, second operating parameter, such as engine coolant inlet temperature.

In some implementations, the controller 124 is operable to adjust air flow provided by the first fan 126 and/or second fan 127 and adjust air flow provided by the third fan 128 based on the same operating parameter, such as manifold air temperature. In such implementations, simplified construction and control may be desired. For example, both fans may be adjusted by the same control signal.

In some implementations, the controller 124 is configured to operate the first fan 126 and second fan 127 independent of the third fan 128. As one example, the controller 124 is operable to adjust air flow provided by the first fan 126 based on a first operating parameter, and adjust airflow provided by the third fan 128 based on a second operating parameter different from the first operating parameter. For example, operation of the first fan 126 is adjusted based on manifold air temperature and operation of the third fan 128 is adjusted based on engine coolant temperature. Additionally, the controller 124 may adjust both the first fan 126 and the third fan 128 based on ambient temperature and engine gross horsepower. Adjusting air flow provided by the first fan and the third fan may include varying a speed of driven electric motors of the fans or varying a blade pitch of the fans at constant speed of the electric fan motor. In some implementations, the controller 124 operates the first fan 126 or the third fan 128 in reverse operation for cleaning of the heat exchangers and intake system of the engine cooling package.

Furthermore, in embodiments, the controller 124 is operable to adjust the first cooling shutter 144 and the second cooling shutter 146 to provide thermal control of the engine 102. In some implementations, the controller 124 is operable to adjust the first cooling shutter 144 and the second cooling shutter 146 in conjunction. For example, the controller 124 closes both of the cooling shutters as long as the manifold air temperature is below a threshold temperature indicative of a desired combustion temperature.

In some implementations, the controller 124 is operable to adjust the first cooling shutter 144 independent of adjusting the second cooling shutter 146. For example, the controller 124 closes the first cooling shutter 144 as long as the manifold air temperature is below a threshold temperature indicative of a desired combustion temperature, and closes the second cooling shutter 146 as long as the engine coolant temperature is below a threshold temperature indicative of an engine temperature that is different from the combustion temperature. Independent control of the cooling shutters enables more accurate thermal control of the engine since different components may heat up or cool down at different rates and the cooling shutter can be adjusted to accommodate the individual thermal characteristics of such components.

In some implementations, the controller 124 is operable to adjust the air intake door 110 to a first position that provides intake air from the engine compartment to the air intake passage or a second position that provides ambient environment air to the air intake passage based on operating conditions. For example, the controller 124 adjusts the air intake door 110 to the first position when ambient air is below a first threshold temperature and manifold air temperature is below a second threshold temperature to provide warmer air from the engine compartment to heat the combustion air. As another example, the controller 124 adjusts the air intake door 110 to the second position when manifold air temperature is above the second threshold temperature to provide cooler air from the ambient environment for denser intake air charge.

In implementations that include variable compression turbochargers, such as variable geometry turbochargers, the controller 124 is operable to adjust an amount of compression produced by the compressor 114 based on an operating parameter, such as manifold air temperature. For example, the controller 124 adjusts the turbocharger 116 to increase compression to heat combustion air to a desired temperature.

In order to control the cooling fans and associated shutters, the controller 124 may include a first regulator 160 and a second regulator 162. The first regulator 160 may be configured to control the speed of first fan 126 and second fan 127, and control the position of cooling shutter 144 based on manifold air temperature (as determined from sensor 148), ambient temperature, and engine output. The second regulator 162 may be configured to control the speed of third fan 128 and the position of cooling shutter 146 based on engine coolant inlet temperature (as determined from sensor 150), ambient temperature, and engine output.

Figure 2:
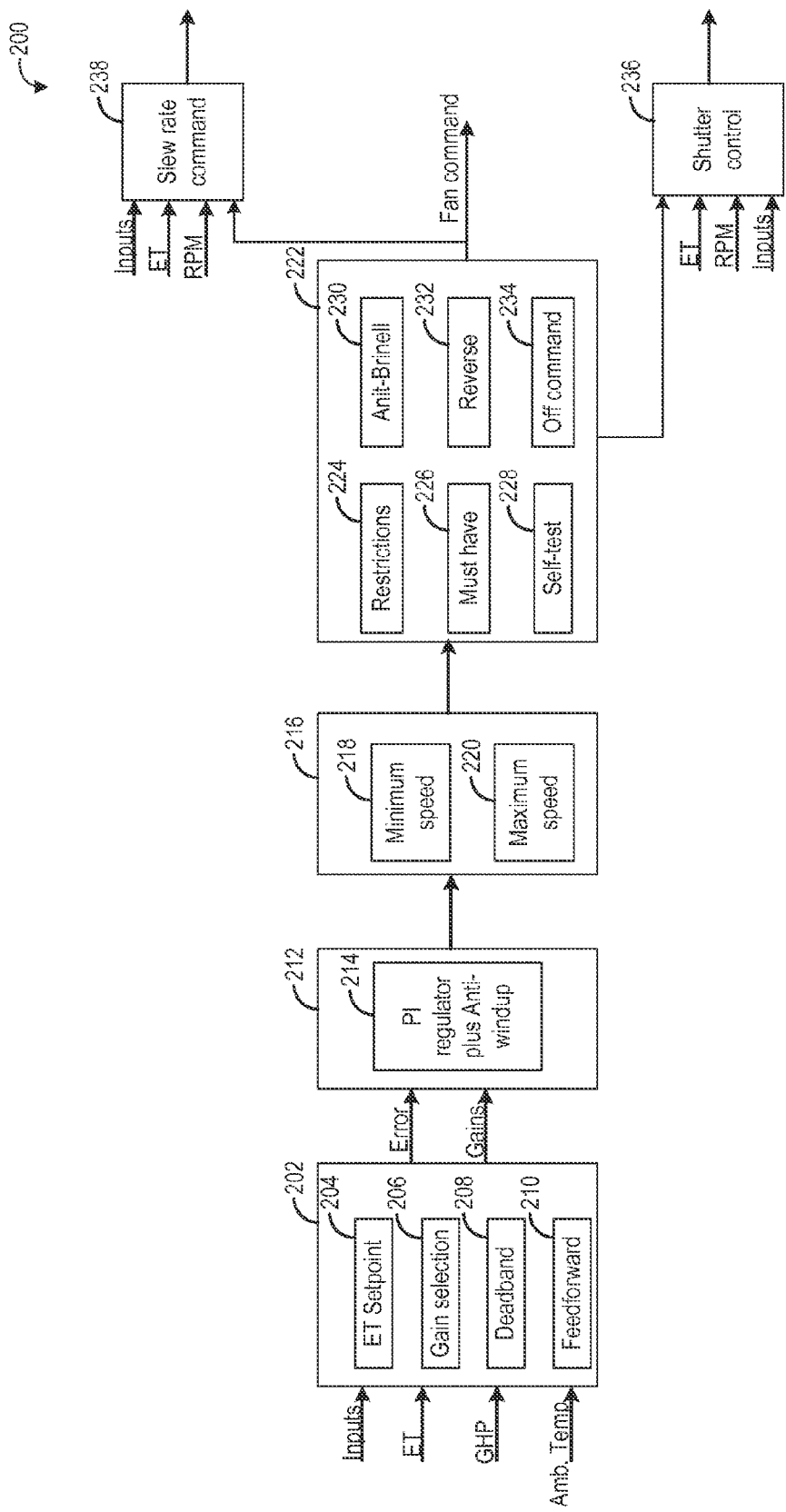
FIG. 2 shows a diagram of a process for controlling a speed of a cooling system fan according to an embodiment of the present invention.

FIG. 2 is a diagram illustrating a process 200 for fan speed and shutter position control by a regulator of a controller. Process 200 is one example of a process that may be executed by first regulator 160 or second regulator 162 in order to output a fan speed and shutter position command. Process 200 determines a difference between a measured engine temperature and a desired engine temperature, and outputs a command to adjust the fan speed based on the difference. Process 200 also utilizes an expected fan speed based on ambient temperature and engine output to determine the fan adjustment.

Block 202 of process 200 comprises a conditioning block, where a plurality of inputs is received. The inputs include engine temperature (ET) (measured/actual engine temperature), ambient temperature, engine gross horsepower (GHP), and additional inputs such as engine speed and load, manifold pressure, etc. The engine temperature may comprise manifold air temperature (when the process 200 is executed by first regulator 160 in order to control a fan cooling an air-to-air intercooler, such as first fan 126), engine coolant inlet temperature (when the process 200 is executed by second regulator 162 in order to control a fan cooling an air-to-coolant radiator, such as third fan 128), and/or other suitable engine temperatures.

Conditioning block 202 determines a set point ET at 204. The set point ET indicates the desired ET for a given set of operating conditions, and may be a function of engine output. Engine output may include engine load, torque, horsepower, GHP, or other measurement of engine power. As used herein, GHP indicates engine power output. In one example, GHP may be measured in watts. For example, as engine output increases, the ET set point may decrease to ensure adequate engine cooling. Conditioning block 202 selects an appropriate amount of gain at 206, which defines the sensitivity of the system response to a change in input. The gain may be selected via a look-up table, and is based on ambient temperature and GHP.

Conditioning block 202 also determines an amount of deadband to apply at 208. The deadband may indicate a range of values in which fan regulation will not occur. For example, if the measured ET falls is within a deadband range of the ET set point, then a command to adjust the fan speed may not be output. Additionally or alternatively, if the commanded fan adjustment is within a deadband range of the current fan speed, then the current fan speed may be maintained without adjustment.

At 210, conditioning block 202 includes a feedforward input. In one embodiment, the feedforward input is an expected fan speed obtained from a look-up table, based on ambient temperature and engine output (such as GHP, engine load, torque, etc.). The expected fan speed is the steady state fan speed for a given ambient temperature and engine output. By including the feedforward fan speed adjustment, the fan speed, which is output following a post-regulator and control block (described below), may be maintained closer to the expected steady state speed, even during transient events, in order to avoid speed fluctuations.

As used herein, feedforward describes the use of a controlling signal from a source in the control system's external environment (e.g., ambient temperature and engine output) to adjust the output (e.g., the fan speed) in a pre-defined way. In contrast, a system that uses feedback controls the output based on the error between a desired state (e.g., temperature set point) and the actual state (e.g., measured temperature).

The conditioning block 202 outputs error and gain to a regulator block 212. The gain is selected by the gain selection 206, as described above. The error may be the difference between the set point ET and the measured ET input into the conditioning block. The error may also include the difference between the expected feedforward fan speed and the current fan speed.

The regulator block 212 applies the gain to the error in order to determine how much to adjust the fan. The regulator may utilize proportional control, proportional plus integral (PI) control, proportional-integral-derivative control, or another suitable mechanism to apply the gain to the error to output a fan speed adjustment. The regulator block also includes an anti-windup function at 214. The anti-windup may be utilized by a controller that has at least some integral feedback control. The anti-windup counteracts possible windup in the integrator that may be caused by non-zero steady state error, for example due to the physical limits of the system variables. By using anti-windup, unwinding of the integrator due to excessive wind up from the non-zero steady state error may be avoided. The anti-windup may comprise Hanus anti-windup or another anti-windup mechanism.

The regulator outputs a fan command to a post-regulator block 216. The post-regulator block 216 ensures that the fan command falls within a range that meets the mechanical limits of the fan. The post-regulator includes a minimum fan speed 218 and a maximum fan speed 220, and if the fan command is outside the minimum or maximum speed, it is adjusted to be within the range of the minimum and maximum speed.

The adjusted fan command is output to a control block 222. The control block 222 includes additional restrictions and/or adjustments that may be made to the fan command to match power demands, mechanical constraints, etc., of the fan, cooling system, and/or vehicle system in which the cooling system is installed. The control block 222 includes restrictions at 224, must-have logic at 226, self-test at 228, anti-Brinell at 230, reverse at 232, and an off command at 234. The restrictions indicate whether operating conditions exist that may restrict the speed of the fan. The must-have logic obtains the power demand for the entire vehicle system, and determines if enough power is available to deliver the commanded fan speed. The anti-Brinell is the minimum amount of fan spin needed to avoid fan degradation. These adjustments and the other restrictions/adjustments within the control block 222 act to fine-tune and/or place limits on the degree to which the fan speed can be changed. Additionally, they may adjust operating parameters of the cooling system or vehicle system in order to be able to adjust the fan speed as desired.

The control block 222 outputs a final fan command that is used to adjust the fan speed. This final fan command is also fed into a shutter control block 236. The shutter control block 236 uses the fan command, measured ET, fan speed, and other inputs to determine a position for the cooling shutter (e.g., a position that will provide better operational performance versus controlling the cooling shutter to other positions, given the conditions at hand). The final fan command is also fed into a slew rate command block 238. The slew rate command block 238 uses the fan command, measured ET, fan speed, and other inputs to determine a slew rate at which to adjust the fan speed. The slew rate may be based on a time constant of the cooling system response to the fan adjustment. For example, when adjusting the first fan 126 that cools the air-to-air intercooler 122, the cooling system responds relatively rapidly to the fan adjustment compared to the cooling system response to fan adjustments for the third fan 128 that cools the air-to-coolant radiator 133 (e.g., the first fan 126 has a smaller time constant than the third fan 128). The slew rate limits how quickly the fan speed is adjusted, in order to avoid a rapid change in fan speed that may be counteracted by the regulator.

Thus, process 200 utilizes a desired and measured engine temperature (MAT or engine coolant inlet temperature, for example), ambient temperature, and engine output to adjust the speed of a cooling system fan and adjust a position of a cooling system shutter to maintain the cooling system at the desired temperature. The process may be executed by a controller, and includes a regulator to determine the commanded fan speed. The regulator utilizes determined error (e.g., between measured and desired engine temperature) and gain (which is a function of ambient temperature and engine output) to determine a first fan adjustment. The regulator also independently determines a second fan adjustment based on the expected fan speed, which is a function of ambient temperature and engine output, and the gain. The first and second fan adjustments may be added together, for example, to arrive at the commanded fan adjustment that is output of the regulator.

As explained above, the first fan 126 and second fan 127 may be controlled by a first regulator 160 and the third fan may be controlled by a second regulator 162. The regulators utilize different engine temperature input (MAT and engine coolant inlet temperature, respectively) and also include different amounts of gain. In one example, the gain for the first regulator 160 is higher than the gain for the second regulator 162. Thus, the first and second fans 126, 127, which cool an air-to-air intercooler, may be regulated differently than the third fan 128, which cools an air-to-coolant radiator.

In embodiments, there may be a first fan for cooling the air-to-air intercooler, and a second fan for cooling the air-to-coolant radiator. (This does not preclude the possibility of other fans for cooling the air-to-air intercooler and/or the air-to-coolant radiator, although in one embodiment, there is a first fan for the air-to-air intercooler and a second fan for the air-to-coolant radiator only.) Thus, the cooling system of FIG. 1, which includes a controller configured to execute the process of FIG. 2, provides for an engine cooling system comprising a first fan to provide air flow to an air-to-air intercooler and a second fan to provide air flow to an air-to-coolant radiator. The system also includes a first regulator configured to (e.g., including instructions to) adjust a speed of the first fan based on manifold air temperature and further based on ambient temperature and gross horsepower. The first regulator may be further configured to adjust the speed of the first fan by determining a first error and applying a first gain. The system additionally includes a second regulator configured to (e.g., including instructions to) adjust a speed of the second fan based on an engine coolant inlet temperature and further based on ambient temperature and gross horsepower. The second regulator may be configured to adjust the speed of the second fan by determining a second error and applying a second gain, where the second gain is lower than the first gain.

Figure 3:
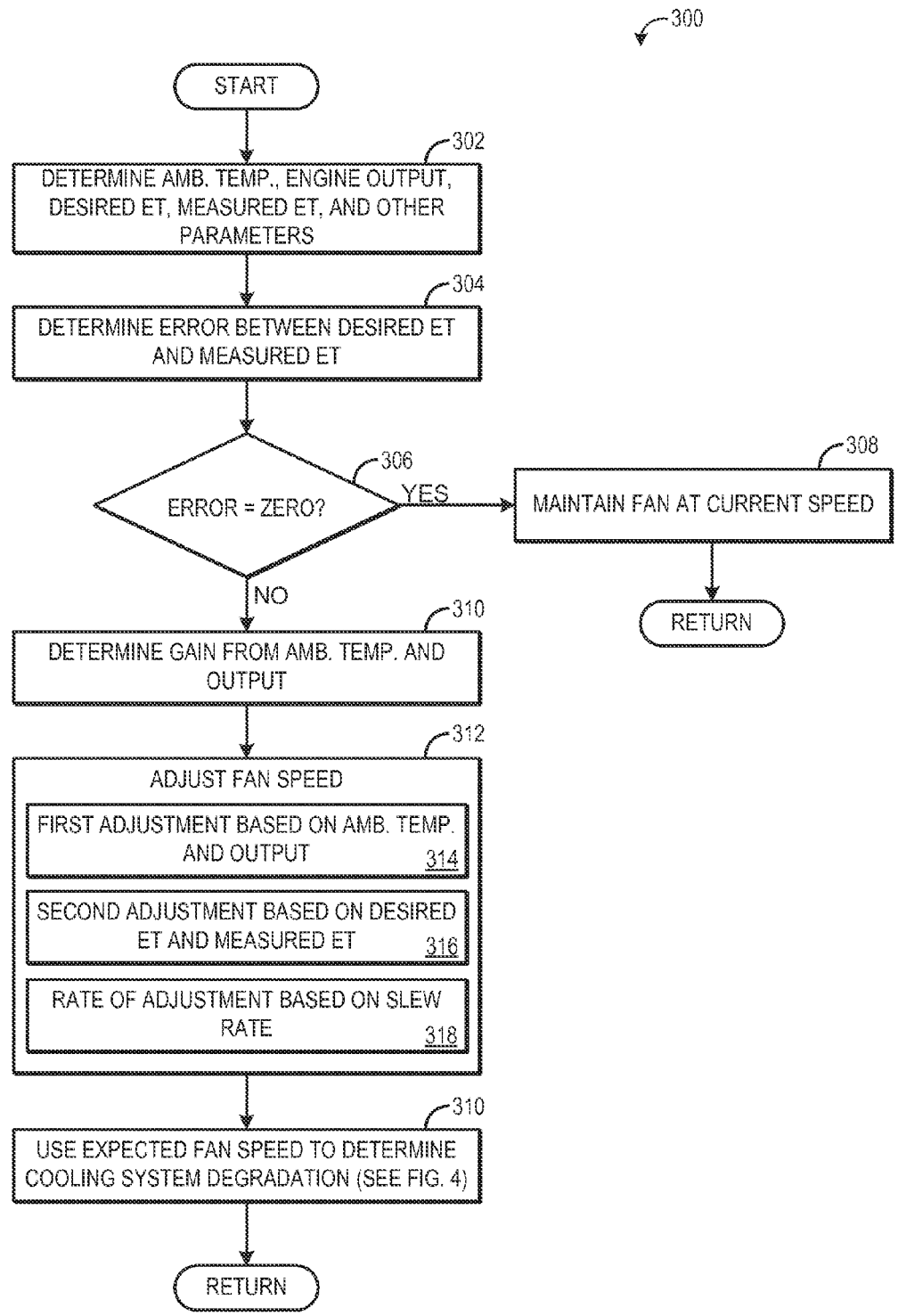
FIG. 3 is a flow chart illustrating a method for adjusting a cooling system fan according to an embodiment of the present invention.

FIG. 3 is a flow chart illustrating a method 300 for controlling a fan speed according to an embodiment of the present invention. Method 300 may be carried out by a controller, such as controller 124, according to instructions stored thereon, in order to control the speed of a cooling system fan, such as first fan 126 or third fan 128. At 302, method 300 includes determining engine operating parameters, including ambient temperature, engine output (e.g., gross horsepower, horsepower, load, torque), engine temperature, such as MAT or engine coolant inlet temperature, and other parameters. The engine operating parameters may be determined by measuring the parameter in question (e.g., a measured engine temperature may be obtained, such as with sensors operably coupled with the engine system), receiving data/information of the parameter (e.g., from another system), or the like. Desired engine temperature may also be determined.

At 304, the error (i.e., difference) between the desired engine temperature and the measured engine temperature is determined. At 306, it is determined if the error is equal to zero. If the error is equal to zero, the desired and measured engine temperatures are equal, and hence method 300 proceeds to 308 to maintain the current fan speed without adjustment, and then method 300 returns.

If the error is not equal to zero, method 300 proceeds to 310 to determine the amount of gain from the ambient temperature and engine output. At 312, the fan speed is adjusted. Adjusting the fan speed includes, at 314, determining a first fan adjustment based on the ambient temperature and the engine output. The ambient temperature and engine output may be used to obtain an expected steady-state fan speed from a look-up table. The first adjustment may include an adjustment to bring the fan speed to the expected fan speed, and also includes the gain. Adjusting the fan speed also includes, at 316, determining a second adjustment based on desired and measured engine temperature. The second adjustment is independent of the first adjustment, and applies the gain to the error between the measured and desired engine temperature to bring the engine temperature to the desired temperature. Both the first and second adjustments may be used to arrive at a final fan speed adjustment.

Adjusting the fan speed also includes determining a slew rate at 318 in order to set a rate of change of the fan speed. As explained above, the slew rate controls the fan speed adjustment so that the speed is adjusted gradually. The slew rate may be applied to the final output that is used to adjust the fan speed. However, in some embodiments, the slew rate may be applied to the first adjustment (e.g., the feedforward input described above with respect to FIG. 2 may include a slew rate). The fan speed may then be adjusted based on the output fan command signal. Example fan speed adjustments for two cooling system fans that may result from the execution of method 300 and/or process 200, including example slew rates, are illustrated in FIGS. 5 and 6.

Figure 5:
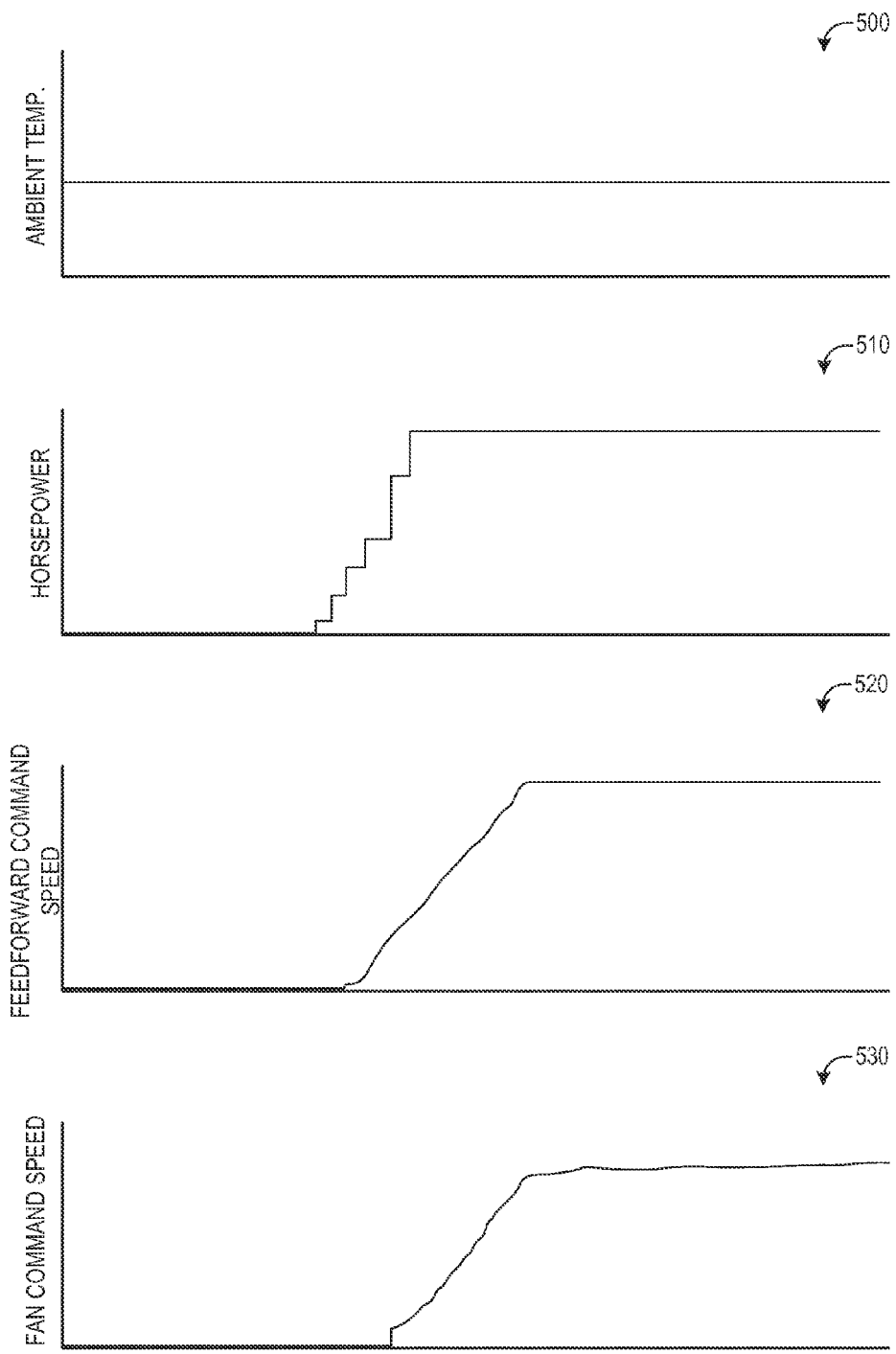
FIG. 5 is a diagram illustrating examples of cooling system operating parameters during adjustment of an air-to-air fan.

FIG. 5 illustrates a fan speed adjustment for a fan configured to cool an air-to-air cooler, such as first fan 126. FIG. 5 includes an ambient temperature diagram 500, gross horsepower diagram 510, feedforward command speed diagram 520, and a fan command speed diagram 530. For each diagram, time is depicted along the x-axis, and each respective operating parameter is depicted along the y-axis. Diagram 500 illustrates that ambient temperature is maintained at a steady temperature during the illustrated time duration. However, as illustrated by diagram 510, the gross horsepower starts at zero and then rapidly climbs before reaching a steady state value. The fan speed may be adjusted correspondingly to match the increase in GHP. Diagram 520 illustrates an example feedforward fan speed command including a slew rate. The feedforward fan command is the first adjustment that will be used to adjust the fan speed, and is a function of an expected fan speed at the ambient temperature and GHP. The slew rate limits the rate at which the fan is adjusted. For example, rather than increasing the fan speed at a rate similar to the increase in GHP, the slew rate increases the fan speed gradually, for example at a rate of 100 RPM/sec. Diagram 530 illustrates the second adjustment, or the fan speed command based on the desired and measured engine temperature.

Figure 6:
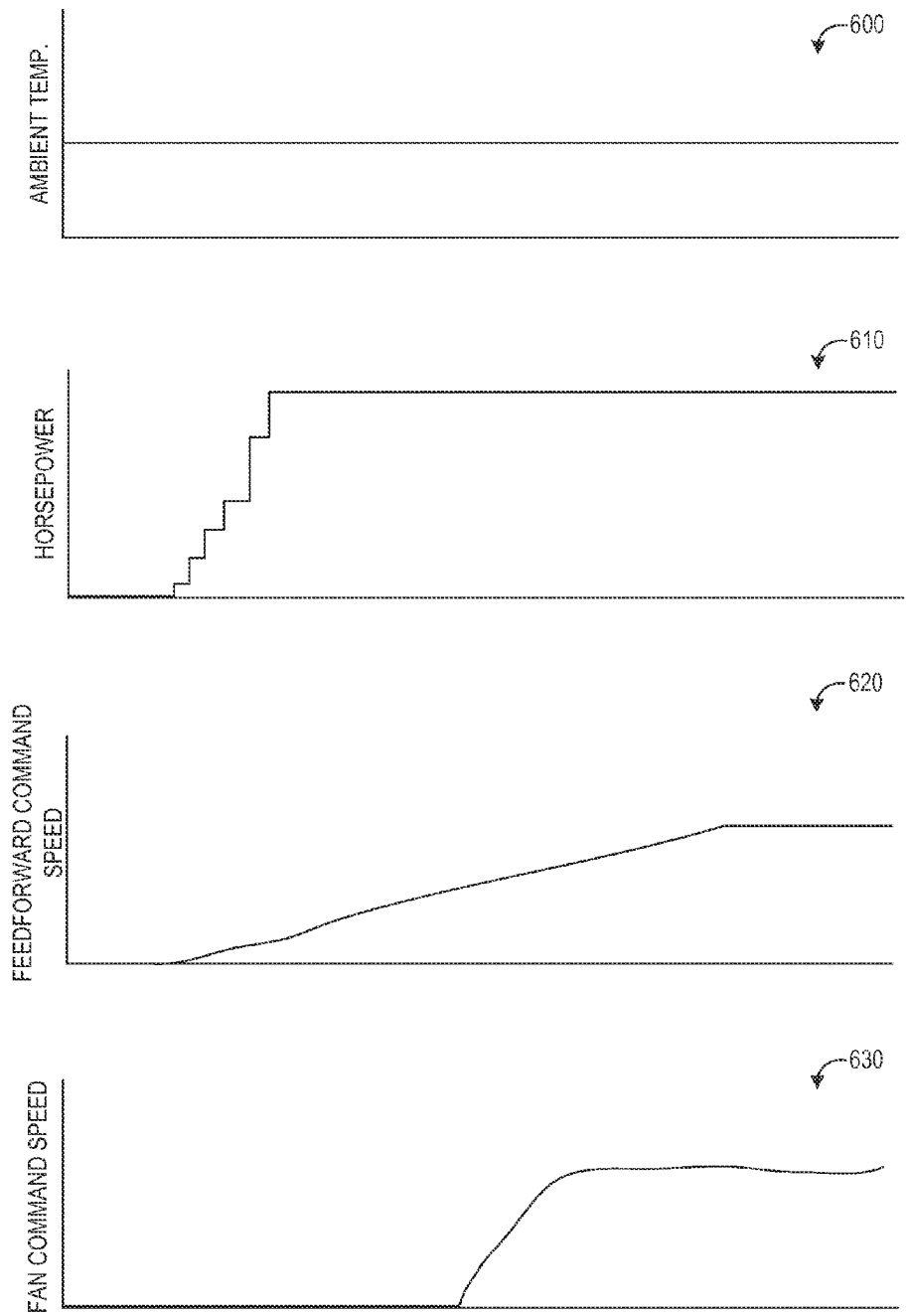
FIG. 6 is a diagram illustrating examples of cooling system operating parameters during adjustment of an air-to-coolant fan.

FIG. 6 illustrates a fan speed adjustment for a fan configured to cool an air-to-coolant radiator, such as third fan 128. Similar to FIG. 5, FIG. 6 includes an ambient temperature diagram 600, gross horsepower diagram 610, feedforward command speed diagram 620, and a fan command speed diagram 630. As the air-to-coolant cooler responds to a change in fan speed less rapidly than the air-to-air cooler (e.g., has a longer time constant), the slew rate for the feedforward command, illustrated in diagram 620, is slower than the slew rate illustrated in diagram 520 of FIG. 5. For example, the slew rate for the third fan 128 may comprise a rate of 2.5 RPM/sec.

Returning to FIG. 3, after outputting the fan speed command to adjust the speed of the fan, method 300 may include, at 320, determining if cooling system degradation is present based on the expected fan speed, which is explained below with respect to FIG. 4. Method 300 then returns.

Thus, process 200 of FIG. 2 and method 300 of FIG. 3 provide for adjusting a speed of a cooling system fan based on engine temperature, ambient temperature, and engine output. By including two independent adjustments, fan speed fluctuations above or below a target fan speed may be avoided, thus maintaining precise engine temperature control.

In one example, method 300 may adjust a speed of a cooling system fan with a first adjustment based on ambient temperature and engine gross horsepower, but independent of a measured coolant or charge air temperature. A further adjustment may be made to the speed with a second adjustment based on a desired engine temperature and the measured coolant or charge air temperature. The second adjustment may be based on an error between desired and measured coolant or charge air temperature, along with a gain, the gain adjusted based on ambient temperature and engine output. Engine output may include horsepower, gross horsepower, torque, or other parameters. If the cooling system fan cools an air-to-air intercooler, the measured and desired temperature may be manifold air temperature, while if the cooling system fan cools an air-to-coolant radiator, the measured and desired temperature may be an engine coolant inlet temperature.

In another example, method 300 may adjust air flow provided by a first fan to an air-to-air intercooler. The air flow may be adjusted to maintain a desired manifold air temperature and to maintain an expected fan speed of the first fan for a given ambient temperature and gross horsepower. The method may also adjust air flow provided by a second fan to an air-to-coolant radiator. The air flow provided by the second fan may be adjusted to maintain a desired engine coolant inlet temperature. The air flow provided by the second fan may be further adjusted based on an expected speed of the second fan at the ambient temperature and gross horsepower.

While the above described process and method utilize MAT and engine coolant inlet temperatures to control an air-to-air cooler fan and an air-to-coolant radiator fan, respectively, other fans and other inputs are also possible. For example, the speed of other engine fans, such as an oil cooler fan, EGR cooler fan, etc., may be adjusted based on relevant engine temperatures and a feedforward command of an expected fan speed.

Figure 4:
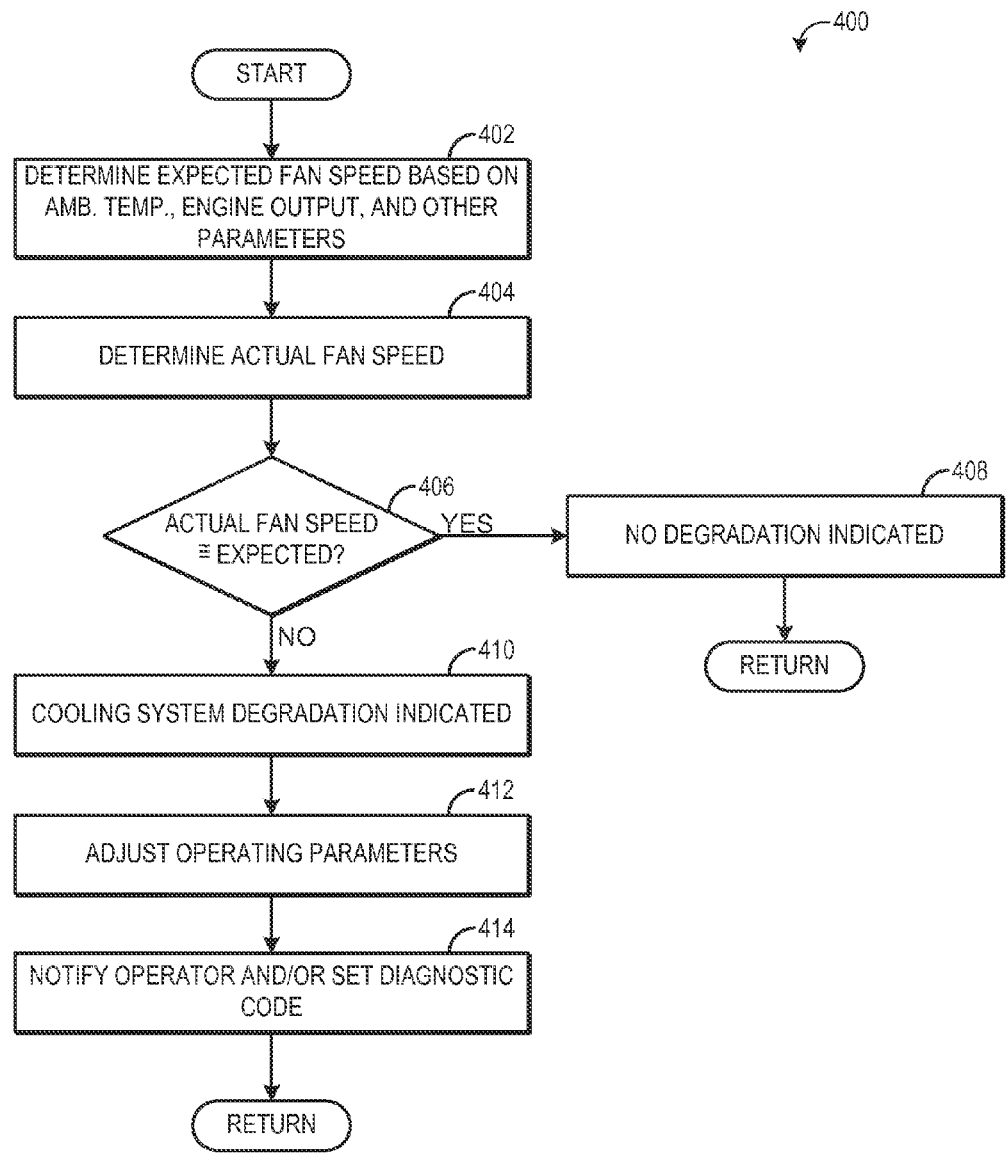
FIG. 4 is a flow chart illustrating a method for determining cooling system degradation according to an embodiment of the present invention.

Turning to FIG. 4, a method 400 for determining cooling system degradation is illustrated. Method 400 may be carried out by controller 124 during steady state operating conditions, when the cooling system fan is operated at a speed that matches an expected fan speed. Method 400 includes, at 402, determining an expected cooling system fan speed. As explained above with respect to FIG. 2, an expected cooling system fan speed may be stored in a look-up table as a function of ambient temperature and GHP or other engine output parameters. At 404, the current fan speed is determined. The current fan speed may be determined by feedback from a fan speed sensor, or by determining the most recent fan speed command output by the controller. At 406, it is determined if the actual fan speed is approximately equal to the expected fan speed. The actual fan speed being approximately equal to the expected fan speed may include being at or within a 5% range of the expected fan speed. In another example, it may include being at or within a 10% range of the expected fan speed.

If the expected fan speed is approximately equal to the current fan speed, method 400 proceeds to 408 to indicate no cooling system degradation, as the fan is being accurately controlled according to the given operating parameters. However, if the expected fan speed is not approximately equal to the current fan speed, for example if the expected fan speed differs from the current fan speed by more than a threshold amount, method 400 proceeds to 410 to indicate cooling system degradation. The cooling system fan may be experiencing motor performance issues, or the cooling system may be leaking water, include degraded cooling components, or other degradation that may reduce system efficiency. Thus, the fan may not be able to attain the speed commanded by the controller for the operating conditions, or the system may be unable to keep the engine coolant or charge air near the set point temperature. Each of the issues may result in the fan speed differing from the expected fan speed.

Upon indicating degradation, method 400 may optionally include adjusting engine operating parameters at 412 and notifying an operator and/or setting a diagnostic code at 414. By adjusting operating parameters, for example by reducing engine speed or load, damage to the engine resulting from the cooling system degradation may be avoided.

Another embodiment relates to a method for cooling an engine. The method comprises adjusting a speed of a cooling system fan of a cooling system of the engine. The speed is adjusted based on ambient temperature, engine output of the engine, and a desired engine temperature of the engine.

Another embodiment relates to an engine cooling system for cooling an engine (e.g., the engine may be onboard a vehicle). The engine cooling system comprises an air-to-air intercooler for adjusting temperature of engine intake air, an air-to-coolant radiator for adjusting temperature of engine coolant, a first fan to provide air flow to the air-to-air intercooler, and a second fan to provide air flow to the air-to-coolant radiator. The engine cooling system further comprises a control system, e.g., a controller having a first regulator portion (e.g., first set of instructions) and a second regulator portion (e.g., second set of instructions). The control system is configured to adjust a speed of the first fan based on manifold air temperature and further based on ambient temperature and a current power output of the engine, e.g., GHP. (In embodiments, the control system is further configured to adjust the speed of the first fan based on determination of a first error and application of a first gain.) The control system is additionally configured to adjust a speed of the second fan based on an engine coolant inlet temperature and further based on the ambient temperature and the power output. (In embodiments, the control system is further configured to adjust the speed of the second fan based on determination of a second error and application of a second gain.)

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   adjusting air flow provided by a first fan to an air-to-air intercooler to maintain a desired manifold air temperature and to maintain an expected fan speed of the first fan for a given ambient temperature and gross horsepower; and
   if a measured fan speed of the first fan is different from the expected fan speed of the first fan by greater than a threshold amount, indicating cooling system degradation.

2. The method of claim 1, further comprising maintaining a desired engine coolant inlet temperature by adjusting air flow provided by a second fan to an air-to-coolant radiator.

3. The method of claim 2, wherein the air flow provided by the second fan is further adjusted based on an expected speed of the second fan at the ambient temperature and gross horsepower.

4. The method of claim 1, further comprising if cooling system degradation is indicated, reducing engine speed.

5. The method of claim 1, further comprising adjusting a position of a cooling system fan shutter based on the ambient temperature and the gross horsepower.

6. The method of claim 1, further comprising adjusting a position of a cooling system fan shutter based on the ambient temperature.

7. The method of claim 1, further comprising adjusting a position of a cooling system fan shutter based on the gross horsepower.

8. The method of claim 1, wherein adjusting air flow provided by the first fan to maintain the desired manifold air temperature comprises adjusting speed of the first fan based on the desired manifold air temperature as compared to actual manifold air temperature, independent of and in addition to adjusting a speed of the first fan to maintain the expected speed.

9. The method of claim 1, wherein adjusting air flow provided by the first fan to maintain the desired manifold air temperature comprises adjusting speed of the first fan based on the desired manifold air temperature as compared to actual manifold air temperature, in addition to adjusting speed of the first fan to maintain the expected speed.

10. The method of claim 1, wherein adjusting air flow provided by the first fan to maintain the desired manifold air temperature comprises adjusting speed of the first fan.

11. A cooling system, comprising:
an air-to-air intercooler for adjusting temperature of engine intake air;
an air-to-coolant radiator for adjusting temperature of engine coolant;
a first fan to provide air flow to the air-to-air intercooler;
a second fan to provide air flow to the air-to-coolant radiator; and
a controller having instructions for:
adjusting air flow provided by the first fan to the air-to-air intercooler to maintain a desired manifold air temperature and to maintain an expected fan speed of the first fan for a given ambient temperature and gross horsepower; and
if a measured fan speed of the first fan is different from the expected fan speed of the first fan by greater than a threshold amount, indicating cooling system degradation.

12. The system of claim 11, wherein the controller includes instructions for maintaining a desired engine coolant inlet temperature by adjusting air flow provided by the second fan to the air-to-coolant radiator.

13. The system of claim 12, wherein the controller includes instructions for further adjusting the air flow provided by the second fan based on an expected speed of the second fan at the ambient temperature and gross horsepower.

14. The system of claim 11, wherein the controller includes instructions for, if cooling system degradation is indicated, reducing engine speed.

15. The system of claim 11, wherein the controller includes instructions for, if cooling system degradation is indicated, reducing engine load.

16. The system of claim 11, further comprising a fan shutter, and wherein the controller includes instructions for adjusting a position of the fan shutter based on the ambient temperature and the gross horsepower.

17. The system of claim 11, wherein the controller includes instructions to adjust the air flow provided by the first fan by adjusting speed of the first fan.

18. The system of claim 17, wherein the controller includes instructions for adjusting speed of the first fan based on the desired manifold air temperature as compared to actual manifold air temperature, in addition to adjusting speed of the first fan to maintain the expected fan speed.

* * * * *